United States Patent
Kalman (10) Patent No.: US 9,249,813 B2
(45) Date of Patent: Feb. 2, 2016

(54) CLAMP

(71) Applicant: Technifab, Inc., Avon, OH (US)

(72) Inventor: Steve Henry Kalman, Wellington, OH (US)

(73) Assignee: TECHNIFAB, INC., Avon, OH (US)

( * ) Notice: Subject to any disclaimer, the term of this patent is extended or adjusted under 35 U.S.C. 154(b) by 176 days.

(21) Appl. No.: 13/794,981

(22) Filed: Mar. 12, 2013

(65) Prior Publication Data

US 2014/0090211 A1    Apr. 3, 2014

Related U.S. Application Data

(60) Provisional application No. 61/708,262, filed on Oct. 1, 2012.

(51) Int. Cl.

| F16B 2/06 | (2006.01) |
|---|---|
| F16B 2/10 | (2006.01) |
| B64C 1/06 | (2006.01) |
| B64C 1/40 | (2006.01) |
| F16B 5/06 | (2006.01) |

(52) U.S. Cl.
CPC ................ F16B 2/065 (2013.01); B64C 1/066 (2013.01); B64C 1/403 (2013.01); F16B 2/10 (2013.01); F16B 5/0692 (2013.01); Y10T 24/44291 (2015.01); Y10T 29/49959 (2015.01)

(58) Field of Classification Search
CPC ............ B25B 5/04; B25B 5/00; B25B 5/067; B25B 5/082; F16B 2/10; F16B 2/065; F16B 5/0692; B64C 1/066; B64C 1/403; Y10T 29/49959; Y10T 24/44291

USPC ....... 24/489, 514, 521, 568, 569, 327, 135 R, 24/135 A, 135 K, 135 N, 525, 507, 457, 24/564, 571; 269/6, 3, 143, 249; 29/244, 29/278, 275, 255

See application file for complete search history.

(56) References Cited

U.S. PATENT DOCUMENTS

| 2,319,521 | A | * | 5/1943 | Schneider et al. ............ 280/484 |
|---|---|---|---|---|
| 2,828,525 | A | * | 4/1958 | Gail Stewart E ................ 24/279 |
| 3,210,069 | A | | 10/1965 | Holtz |
| 3,288,409 | A | | 11/1966 | Bethea, Jr. |
| 3,986,746 | A | * | 10/1976 | Chartier ........................ 294/116 |
| 4,717,102 | A | | 1/1988 | Pflieger |
| 4,733,988 | A | * | 3/1988 | Kelly ............................ 403/373 |
| 4,846,431 | A | | 7/1989 | Pflieger |
| 4,901,963 | A | | 2/1990 | Yoder |
| 4,953,820 | A | | 9/1990 | Yoder |

(Continued)

FOREIGN PATENT DOCUMENTS

GB    2111585    7/1983

*Primary Examiner* — Robert J Sandy
*Assistant Examiner* — Michael Lee
(74) *Attorney, Agent, or Firm* — Calfee, Halter & Grisworld LLP.

(57) ABSTRACT

A clamp includes first and second clamp members having first and second inner surfaces with first and second clamping surfaces and first and second hinge portions joined for pivoting movement about a first axis across a range of clamping positions. A fastener extends through first and second access bores of the first and second clamp members for threaded engagement with a nut. The first and second access bores are elongated to permit pivoting movement of the shaft portion with respect to each of the first and second clamp members.

21 Claims, 9 Drawing Sheets

(56) References Cited

U.S. PATENT DOCUMENTS

| | | |
|---|---|---|
| 5,302,039 A | 4/1994 | Omholt |
| 5,451,116 A | 9/1995 | Czachor et al. |
| 5,779,210 A | 7/1998 | Canson et al. |
| 6,442,805 B2 * | 9/2002 | Pfister .......................... 24/514 |
| 6,568,644 B2 | 5/2003 | Pedersen |
| 6,793,186 B2 | 9/2004 | Pedersen |
| 7,021,855 B2 | 4/2006 | Hardtke et al. |
| 7,077,855 B2 | 7/2006 | Curtis |
| 7,559,513 B2 | 7/2009 | Kovall |
| 8,070,119 B2 | 12/2011 | Taylor |
| 2010/0229355 A1 * | 9/2010 | Wang ............................ 24/489 |
| 2015/0068010 A1 * | 3/2015 | Klingler ................. F16B 2/185 29/426.1 |

* cited by examiner

CLAMP

CROSS-REFERENCE TO RELATED APPLICATION

This application claims priority to and the benefit of U.S. Provisional Patent Application Ser. No. 61/708,262, entitled "CLAMP" and filed Oct. 1, 2012, the entire disclosure of which is incorporated herein by reference.

BACKGROUND

Clamps are used in a variety of applications, including for example, to secure two or more items together in an abutting relationship or to attach a first structure (e.g., integral to, assembled with, or otherwise connected with the clamp) to a second structure gripped by the clamp.

SUMMARY

The present application describes clamp assemblies and arrangements and methods for securing a material to a structure (e.g., a plate-type member or frame member) using a clamp. Accordingly, in one exemplary embodiment, a clamp includes first and second clamp members, a nut, and a fastener. The first clamp member includes a first inner surface having a first clamping surface and a first hinge portion, and a first access bore extending from the first inner surface to a first outer surface opposite the first inner surface. The second clamp member includes a second inner surface having a second clamping surface and a second hinge portion joined with the first hinge portion for pivoting movement of the second clamp member with respect to the first clamp member about a first axis across a range of clamping positions, and a second access bore extending from the second inner surface to a second outer surface opposite the second inner surface. The nut is adjacent to the second outer surface and includes a threaded bore aligned with the second access bore. The fastener includes a head portion adjacent to the first outer surface and a threaded shaft portion extending through the first and second access bores for threaded engagement with the threaded bore of the nut. The first and second access bores are elongated to permit pivoting movement of the shaft portion with respect to each of the first and second clamp members.

In an exemplary method of attaching a material to a frame member, a clamp is provided a with first and second clamp members pivotally joined at a first end, with the first and second clamp members including opposed first and second clamping surfaces at a second end opposite the first end. A first side of the frame member is engaged with the first clamping surface, such that the edge of the frame member abuts a projection disposed on an inner surface of the first clamp member. The second clamp member is pivoted about a first axis parallel to the edge of the frame member to a clamping position to engage the second clamping surface with the second side of the frame member. A clamping fastener is installed through aligned first and second access bores in the first and second clamp members. The clamping fastener is tightened against the first and second clamp members to secure the second clamp member in the clamping position. The material is secured to an attachment feature disposed on an outer surface of the first clamp member.

In still another exemplary embodiment, a clamp is provided in combination with a frame member having first and second opposed sides extending to an edge. The clamp includes first and second clamp members, a clamp fastening mechanism, and an attachment feature. The first clamp member includes a first inner surface having a first hinge portion and a substantially planar first clamping surface engaging a first side of the frame member, the first clamping surface extending to a projection disposed on the first inner surface, the projection abutting the edge of the frame member. The second clamp member includes a second inner surface having an arcuate second clamping surface engaging the second side of the frame member, and a second hinge portion pivotally joined with the first hinge portion for pivoting movement of the second clamp member with respect to the first clamp member about a first axis across a range of clamping positions. The arcuate second clamping surface has a radius of curvature about a second axis parallel to the first axis, to provide a uniform band of engagement between the second clamping surface and the second side of the frame member. The clamp fastening mechanism is installed through aligned access bores in the first and second clamp members to secure the first and second clamp members in clamping engagement with the frame member. The attachment feature disposed on an outer surface of the first clamp member for securing a material to the frame member.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention, wherein.

DETAILED DESCRIPTION

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning.

The present invention is directed toward clamping arrangements for securing an item or material to a structure. Exemplary applications include, for example, aerospace applications by which attachments of items or materials (e.g., a fabric liner or foam board) are made to interior aircraft framing using a clamp having an attachment feature (e.g., a snap, hook, or other such fastener), such that the structure of the framing does not need to be modified by drilling, welding, or other such operations. However, a wide variety of clamps using one or more of the inventive features described herein may be used in a wide variety of applications, including, for example, applications in which two or more items or materials are clamped together, or other applications in which an item or material is secured to a structure by an attachment feature disposed on a clamp secured to the structure.

Figure 1:
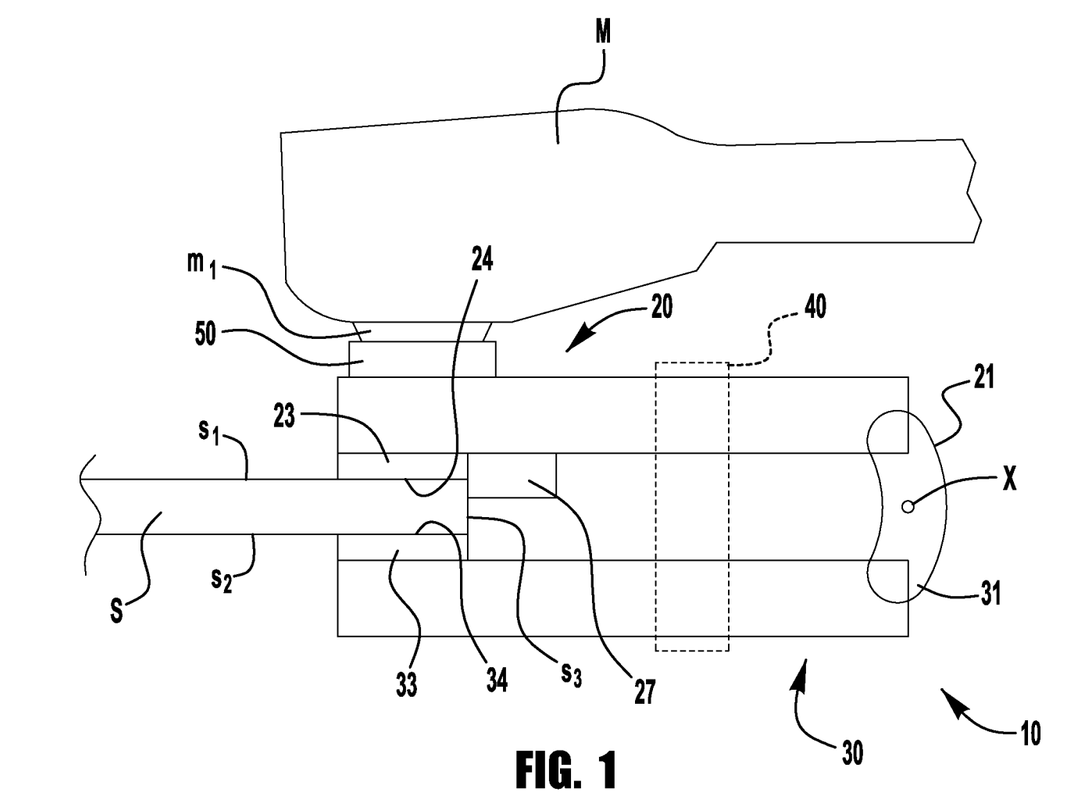
FIG. 1 is a side schematic view of an exemplary clamp secured to a structure.
Figure 2:
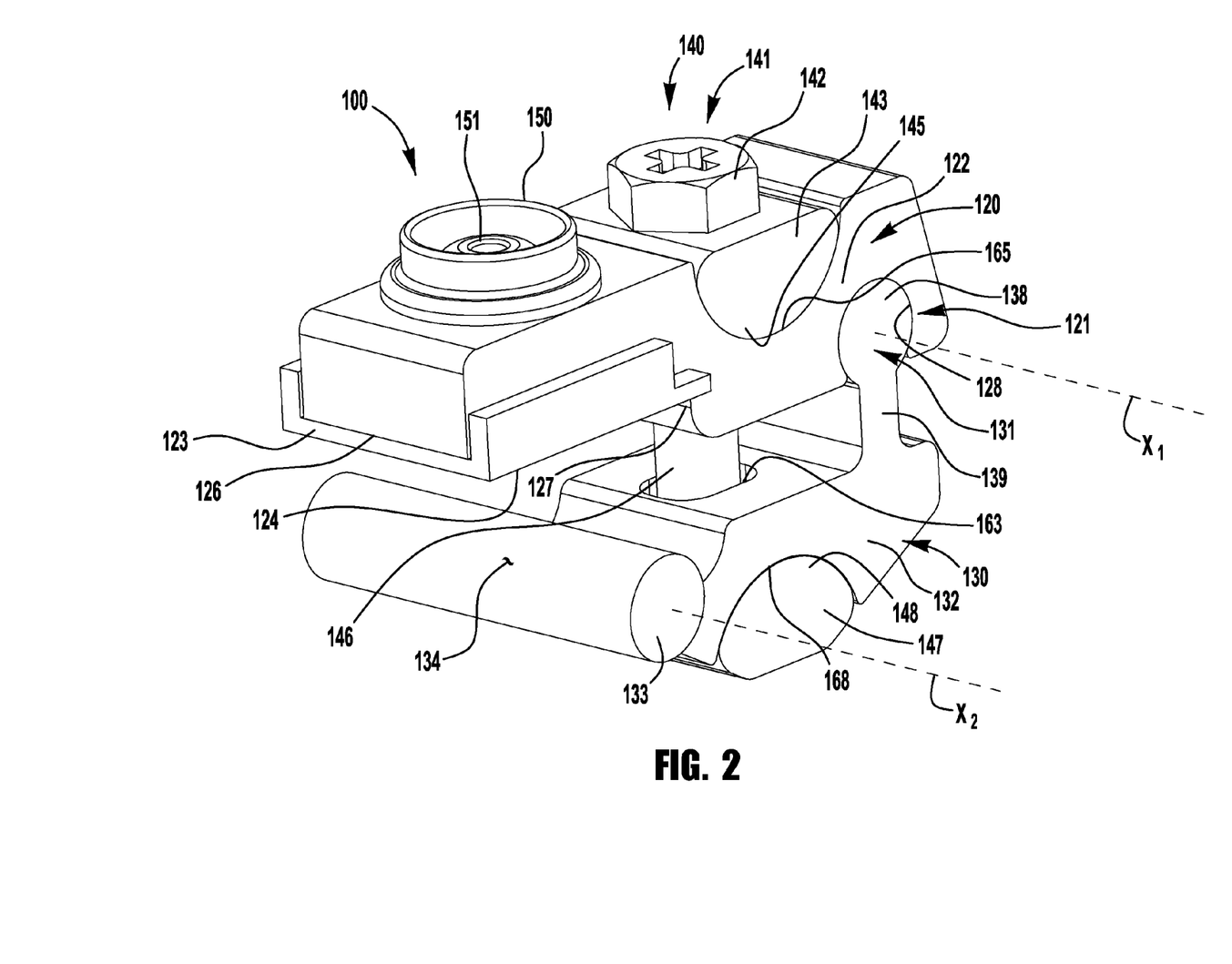
FIG. 2 is a perspective view of an exemplary clamp.
Figure 3:
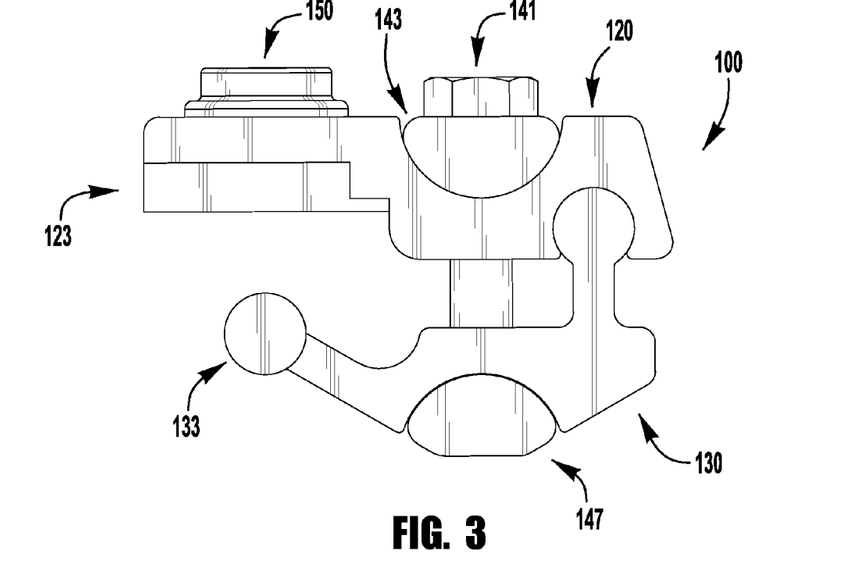
FIG. 3 is a right side elevational view of the clamp of FIG. 2, for which a left side elevational view would be a mirror image thereof.
Figure 4:
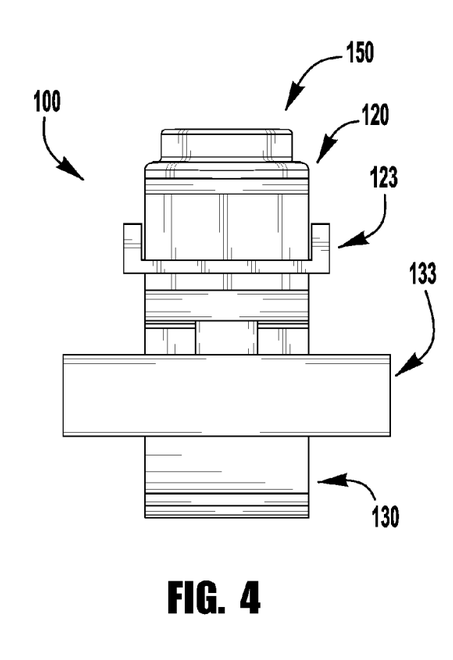
FIG. 4 is a front elevational view of the clamp of FIG. 2.
Figure 5:
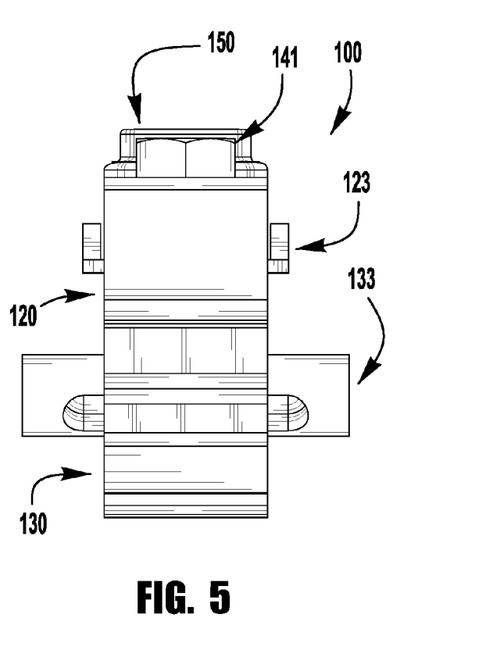
FIG. 5 is a rear elevational view of the clamp of FIG. 2.
Figure 6:
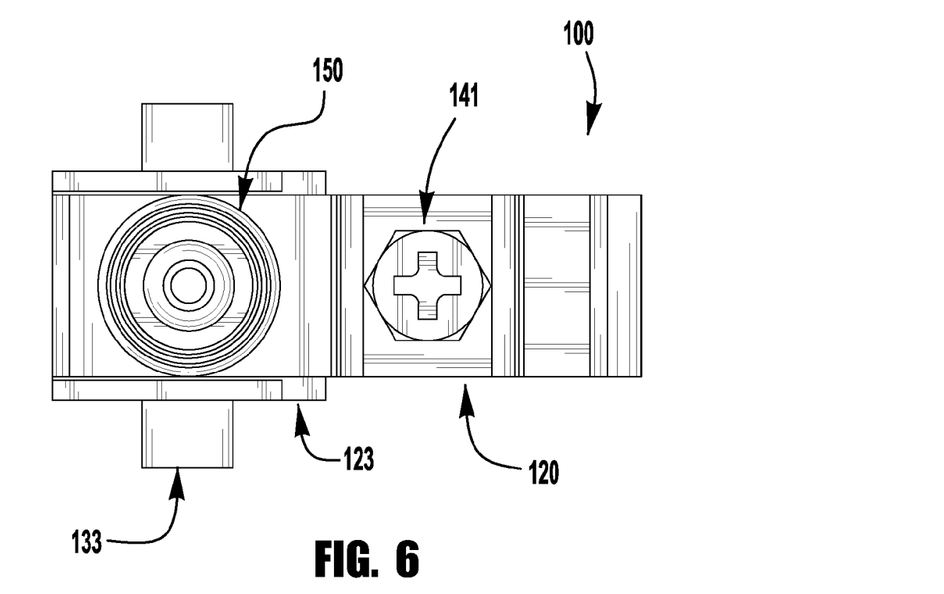
FIG. 6 is a top plan view of the clamp of FIG. 2.
Figure 7:
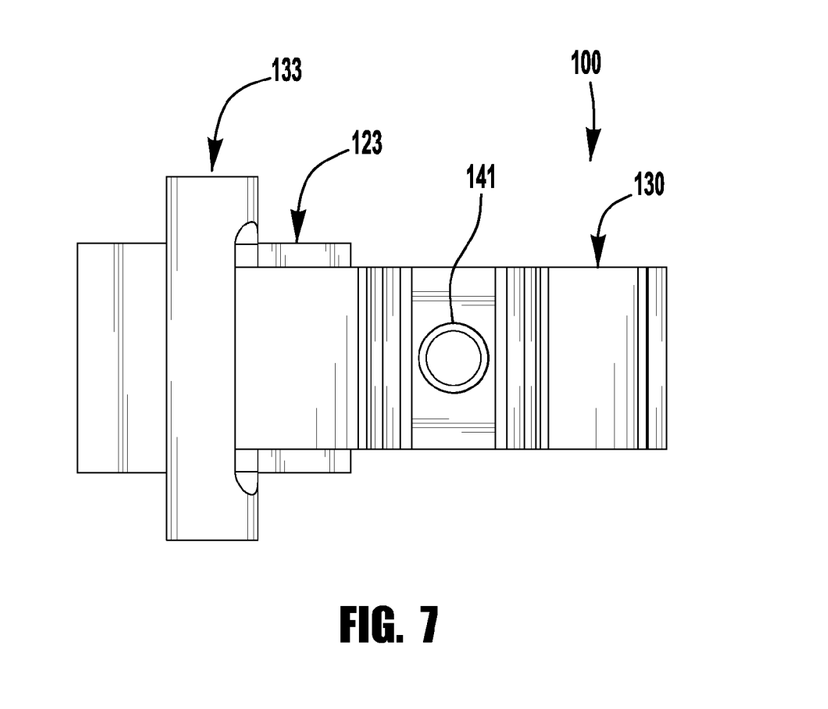
FIG. 7 is a bottom plan view of the clamp of FIG. 2.
Figure 8:
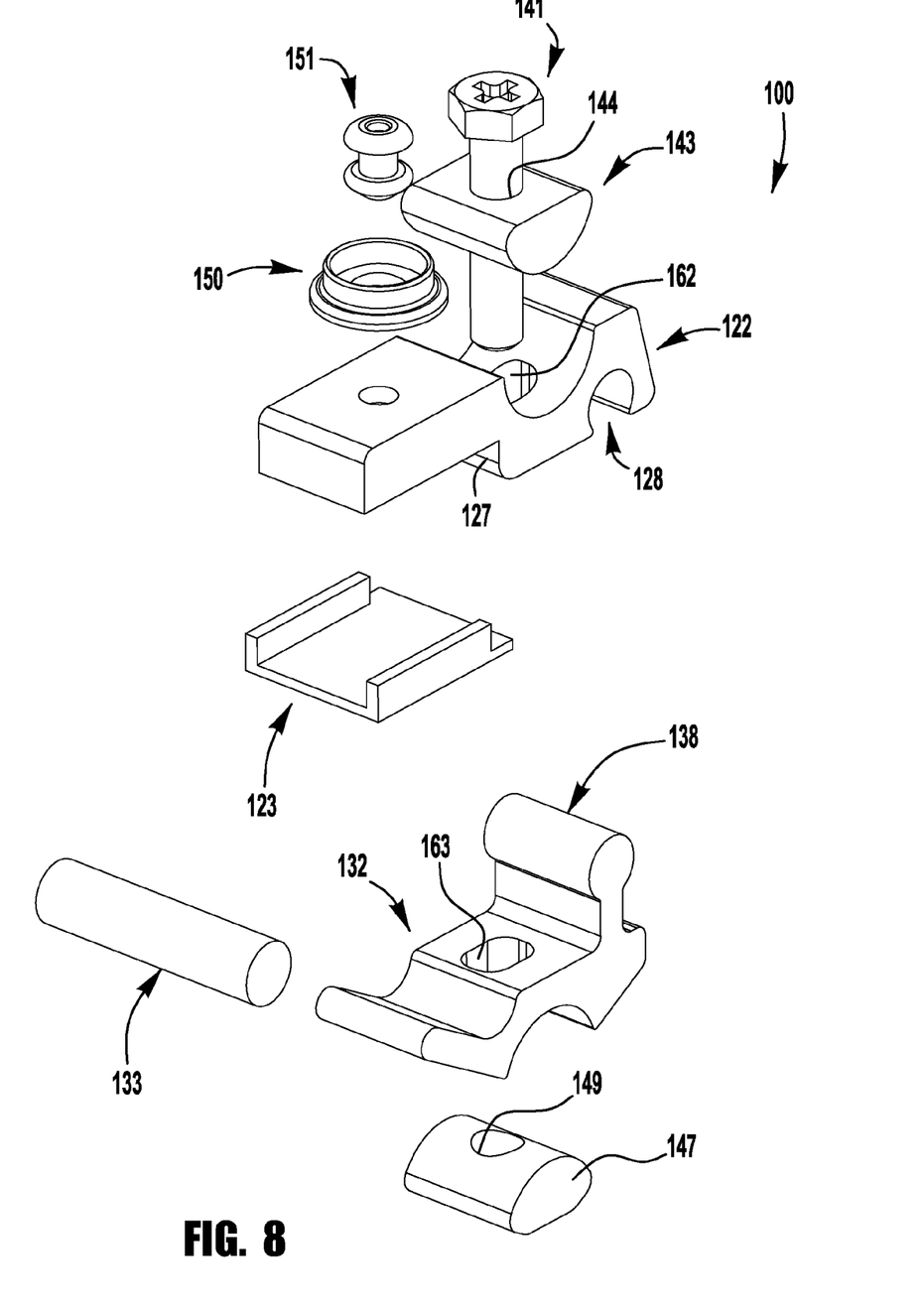
FIG. 8 is an exploded perspective view of the clamp of FIG. 2.

FIG. 1 is a side schematic view of an exemplary clamp 10 secured to a structure S having first and second opposed sides $s_1$, $s_2$ extending to an edge $s_3$. The clamp 10 includes first and second clamp members 20, 30 pivotally connected at a first end (e.g., at hinge portions 21, 31) and provided with opposed clamping surfaces 24, 34 at a second end. While the clamp members 20, 30 may include integral clamping surfaces, in the illustrated schematic, the clamping surfaces 24, 34 are provided on jaw members 23, 33 that are secured to clamp bodies 22, 32, for example, by fasteners or adhesive. A clamp fastening mechanism, shown schematically at 40, secures the first and second clamp members 20, 30 in a clamping position on the structure S. Any suitable clamp fastening mechanism 40 may be used, including, for example, threaded fastener arrangements and ratcheting gear mechanisms.

To secure the clamp 10 to the structure S, the edge $s_3$ of the structure is received between the first and second clamp members 20, 30, and the second clamp member 30 is pivoted about an axis X defined by the hinge portions 21, 31 to a clamping position in which the first and second sides $s_1$, $s_2$ of the structure S are engaged by the first and second clamping surfaces 24, 34. The clamp fastening mechanism 40 is operated to secure the first and second clamp members 20, 30 in this clamping position. To provide for more rigid and/or predictable positioning of the clamp 10 on the structure, one or both of the first and second clamp members 20, 30 (e.g., on one or both of the clamp bodies 22, 32 and/or one or both of the jaw members) may be provided with a clamp positioning feature 27 (e.g., a shoulder or other such projection). When the clamp 10 is installed on the structure S, the clamp positioning feature abuts the edge $s_3$ of the structure S, thereby reducing the tendency of the installed clamp to slide or be out of position on the structure S.

While a clamp 10 may be used to clamp the structure S against an adjacent structure, item, or material, in other embodiments, a clamp 10 may include one or more attachment features, shown schematically at 50, to which another structure, item, or material M may be attached (e.g., using a corresponding attachment feature $m_1$ provided on the other structure, item, or material M). Any suitable attachment feature may be utilized, including, for example, snaps, hooks, threaded fasteners, clips, carabiners, hook-and-loop type fasteners (e.g., VELCRO®). By securing a clamp 10 with an attachment feature 50 to the structure S, attachment of a material M to the structure may be facilitated without modifying the structure (e.g., by drilling holes, welding, etc.) or applying adhesive to the structure.

Many different types of clamps may be utilized to secure an attachment feature to an external structure. One exemplary clamp 100 utilizing several of the features described herein is illustrated in FIGS. 2-10. The illustrated clamp 100 includes first and second clamp members 120, 130 with mating first and second hinge portions 121, 131 at a first end for pivoting movement of the second clamp member 130 with respect to the first clamp member 120 about a first axis or hinge axis $X_1$ defined by the hinge portions 121, 131. Each clamp member 120, 130 includes a clamp body 122, 132 with a jaw member 123, 133 secured to an inner surface of the clamp body at a second end of the clamp member 120, 130 to define a clamping surface 124, 134. While many different types and configurations of jaw members may be utilized, in the illustrated embodiment, the first jaw member 123 is formed as a flanged plate that is secured to a recessed inner surface 126 of the first clamp body 122 (e.g., by an adhesive) to provide a planar first clamping surface 124 on the inner surface of the first clamp body 122. As shown, the first clamping surface 124 may extend substantially to a shoulder 127 on the inner surface of the first clamp body 122. The shoulder 127 may serve to consistently position the clamp 100 with respect to an edge $s_3$ of a structure S (see FIGS. 9 and 10) to be clamped when the edge $s_3$ is abutted against the shoulder 127. The second jaw member 133 is formed as an elongated cylindrical member with a slot or recess 135 (see FIGS. 9 and 10) that receives and is secured to an end portion 136 of the second clamp body 132, for example, using a fastener or adhesive, to provide an arcuate second clamping surface 134. As shown, the arcuate second clamping surface 134 has a radius of curvature about a second axis $X_2$ parallel to the first axis $X_1$, to provide a uniform band of engagement between the second clamping surface 134 and the clamped structure, across a range of clamping positions of the second clamp member 130.

Many different suitable hinge arrangements may be utilized to provide pivoting movement of the clamp members with respect to each other, including, for example, ball and socket hinge arrangements, hinge pin and bracket, and flexible connecting webs. In the illustrated embodiment, the first and second hinge portions 121, 131 include a socket 128 and a bead 138 retained within the socket for sliding pivotal movement within the socket. The socket 128 extends around greater than 180° circumference of the bead 138 to prevent lateral separation of the bead 138 from the socket 128. In the illustrated embodiment, the socket 128 and bead 138 extend along the entire width of the clamp bodies 122, 132, and the second clamp body 132 is assembled with the first clamp body 122 by axially sliding the bead 138 into the socket 128 from the side.

To provide sufficient spacing between the clamping surfaces 124, 134 and to allow for a desirable range of clamping positions, the bead 138 is disposed on a stem portion 139 extending from the inner surface of the second clamp member 130. Additionally, the end portion 136 of the second clamp body 132 may extend inward (e.g., at an angle) to provide sufficient clearance for the edge of the clamped structure and to facilitate clamping of structures having varying thicknesses. The range of pivoting movement of the second clamp member 130 with respect to the first clamp member 120 may be limited by engagement of an edge portion of the socket 128 with the stem portion 139.

Figure 9:
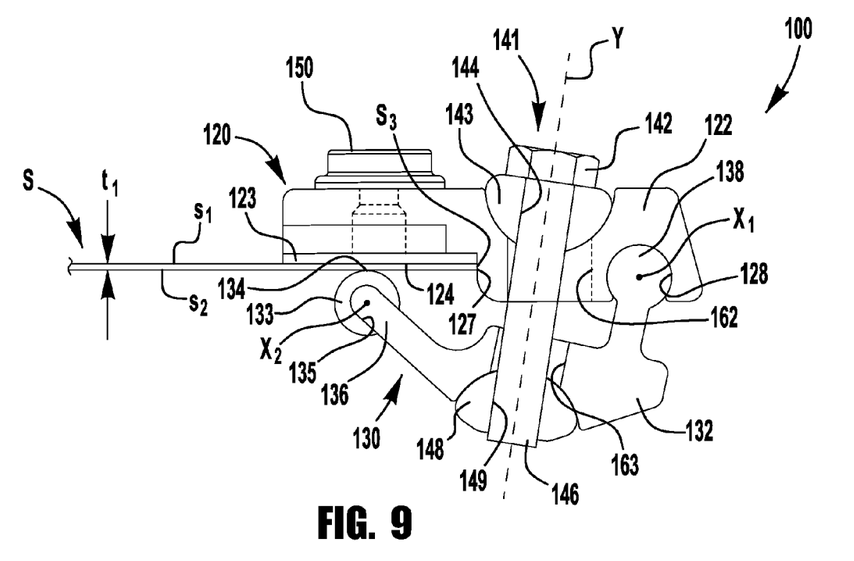
FIG. 9 is a side cross-sectional view of the clamp of FIG. 2, shown assembled to a first frame member in a minimum clamping position.
Figure 10:
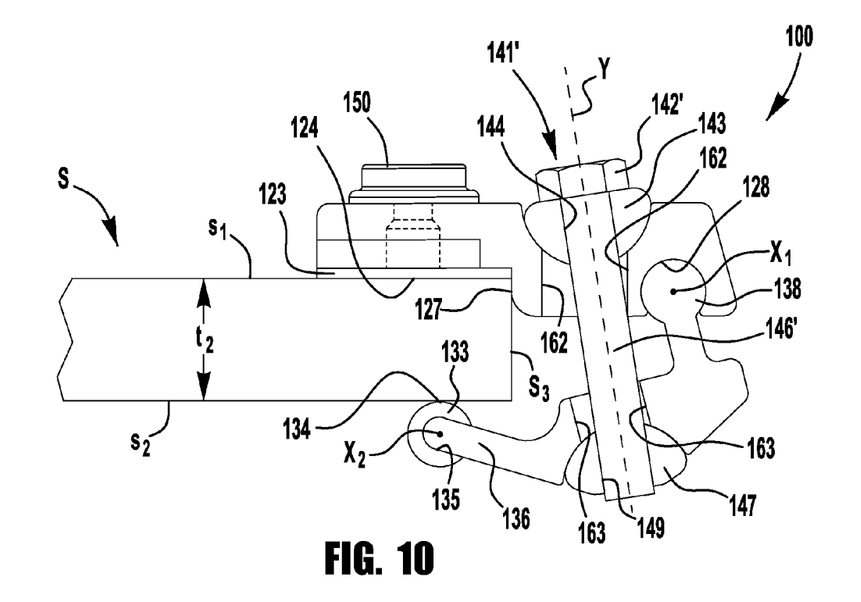
FIG. 10 is a side cross-sectional view of the clamp of FIG. 2, shown assembled to a second frame member in a maximum clamping position.

Many different suitable clamp fastening mechanisms may be utilized to secure the clamp 100 in a desired clamping position. In the illustrated embodiment, as shown in FIGS. 9 and 10, the clamp fastening mechanism 140 includes a threaded bolt 141 that is inserted through aligned access holes 162, 163 in the first and second clamp bodies 122, 132 and threadably engaged with a threaded bore 149 of a nut 147 seated against an outer surface of the second clamp body 132. The exemplary access holes 142, 143 are elongated or oblong in shape, to allow for adjustment of an angle of a central axis Y of the bolt 141 with respect to each of the first and second clamp bodies 122, 132, to adequately secure the clamp members in a wider range of clamping positions. In one such embodiment, the access holes 162, 163 are sufficiently elongated such that the range of clamping positions extends from a minimum clamping position (e.g., a clamping thickness $t_1$ of approximately 0-0.05 inches), as shown in FIG. 9, to a maximum clamping position (e.g., a clamping thickness $t_2$ of approximately 0.45-0.55 inches), as shown in FIG. 10, as limited by contact between the bolt shaft 146 and an edge of one of the elongated access holes 162, 163. In another embodiment, the elongated access holes may be sized such that the range of clamping positions is not limited by engagement between the sides of the bolt 141 and the elongated ends of the access holes 162, 163. For example, the range of clamping positions may instead limited by engagement of the stem portion 139 of the second clamp body 132 with the edge of the socket 128 of the first clamp body 122. As shown in FIG. 10, the clamp 100 may be provided with a longer bolt 141' when clamping to a thicker structure S', to provide full threaded engagement between the bolt shaft 146' and the nut 147.

To provide secure seating engagement of the clamp fastening mechanism 140 with one or both of the first and second clamp bodies 122, 132 in a range of clamping positions, the fastening mechanism 140 and one or both of the clamp bodies 122, 132 may be provided with mating arcuate seating surfaces (e.g., semi-spherical or semi-cylindrical seating surfaces). These arcuate seating surfaces provide for sliding rotational engagement between the clamp fastening mechanism 140 and one or both of the first and second clamp bodies 122, 132, about an axis parallel to the pivot axis of the clamp hinge portion. As one example, a fastener head portion includes a semi-cylindrical seating portion that is complementary to and received within a semi-cylindrical recessed seat disposed in an outer surface of a first clamp member. As another example, a nut portion includes a semi-cylindrical seating portion that is complementary to and received within a semi-cylindrical recessed seat disposed in an outer surface of a first clamp member.

In the illustrated embodiment, a fastener head portion includes the head 142 of the bolt 141 and a washer 143 having a through bore 144 sized to closely receive the shaft 146 of the bolt 141, such that the washer 143 is captured between the bolt head 142 and the first clamp body 122. The washer 143 includes a semi-cylindrical seating portion 145 that mates with a corresponding semi-cylindrical recessed seat 165 in the outer surface of the first clamp member 122. When the bolt 141 is pivoted with respect to the first clamp member 122, the seating portion 145 of the washer 143 rotationally slides against the recessed seat 165 to maintain uniform seating engagement between the seating portion 145 and the recessed seat 165. In other embodiments (not shown), the bolt head may be provided with an integral rear semi-spherical seating portion that mates with a corresponding semi-spherical recessed seat in the outer surface of the first clamp member, allowing the bolt to both rotate about its central axis for threading engagement and pivot with respect to the first clamp member while maintaining uniform seating engagement between the seating portion and the recessed seat.

In the illustrated embodiment, the nut 147 includes a semi-cylindrical seating portion 148 that mates with a corresponding semi-cylindrical recessed seat 168 in the outer surface of the second clamp member 132. When the bolt 141 is pivoted with respect to the second clamp member 132, the seating portion 148 of the nut 147 rotationally slides against the recessed seat 168 to maintain uniform seating engagement between the seating portion 148 and the recessed seat 168. Engagement between the seating portion 148 and the recessed seat 168 also rotationally holds the nut 147 in place as the bolt 141 is threaded or unthreaded with the nut 147. In other embodiments (not shown), a washer with an arcuate seating surface may be provided between the second clamp member and the nut to provide uniform seating engagement with an arcuate recessed seat in the second clamp member, such that a standard threaded nut may be used.

The mating semi-cylindrical seating portions 145, 148 and recessed seats 165, 168 prevent rotation of the washer 143 and nut 147 about the bolt axis Y, thereby facilitating threaded engagement and disengagement of the bolt 141 with the nut 147.

According to another aspect of the present application, a clamp may be provided with an attachment feature configured to facilitate attachment to an item or material, such that the item or material is secured to the clamped structure by the clamp. Many different types of attachment features may be utilized. In the illustrated example, the clamp 100 includes a snap member 150 secured to the outer surface of the first clamp body 122 by a rivet 151. In other embodiments, the snap member 150 may be disposed on other portions of the clamp 100 (e.g., the outer surface of the second clamp member) and secured using other arrangements (e.g., welding, adhesive, threaded fastener, etc.). By providing a corresponding snap member on the item or material to be secured to the clamp (not shown), consistent removable, uniform attachment of the item or material to the clamped structure is enabled.

To secure an item or material to a structure S, the planar clamping surface 124 of the first clamping surface 120 is placed against a first side $s_1$ of the structure S at a location where an attachment point is desired, and the edge $s_3$ of the structure is abutted against the shoulder 127 of the first clamp body 122. The second clamp member 130 is then pivoted about the hinge axis $X_1$ to a clamping position in which the first and second sides $s_1$, $s_2$ of the structure S are grippingly engaged by the first and second clamping surfaces 124, 134. With the washer 143 and nut 147 seated in corresponding recessed seats 165, 168 of the first and second clamp bodies 120, 130, and the bolt 141 received through the washer through bore 144 and the first and second access holes 162, 163, the bolt 141 is tightened with the nut 147 (e.g., to a predetermined torque, for example, 34-36 in-lbs) to secure the first and second clamp members 120, 130 in the clamping position. A snap member provided on the item or material to be secured is engaged with or otherwise fastened to the mating snap member 150 on the first clamp member 120. For example, a fiber or foam board may have a snap member that mates with the snap member 150. By using multiple clamps having such attachment means, the foam or fiber boards that are used to create the interior of an airplane cabin may be fastened to the frame members of the aircraft.

While the clamp components may be provided in any suitable material, in one embodiment, the clamp bodies 122, 132, washer 143, and nut 147 are provided in a strong, lightweight material (e.g., anodized aluminum), and the jaw members 123, 133 are provided in a relatively soft, compressible material (e.g., nylon or other suitable plastic or elastomeric materials) to facilitate gripping engagement and reduce marking or marring of the structure. The bolt 141 may be a conventional steel bolt, and the snap member 150 may be a conventional nickel-plated brass snap component. As shown, the clamp bodies 122, 132 may be provided with a substantially uniform cross-sectional shape, such that the clamp bodies may be efficiently formed from a bar extrusion.

Figure 11A:
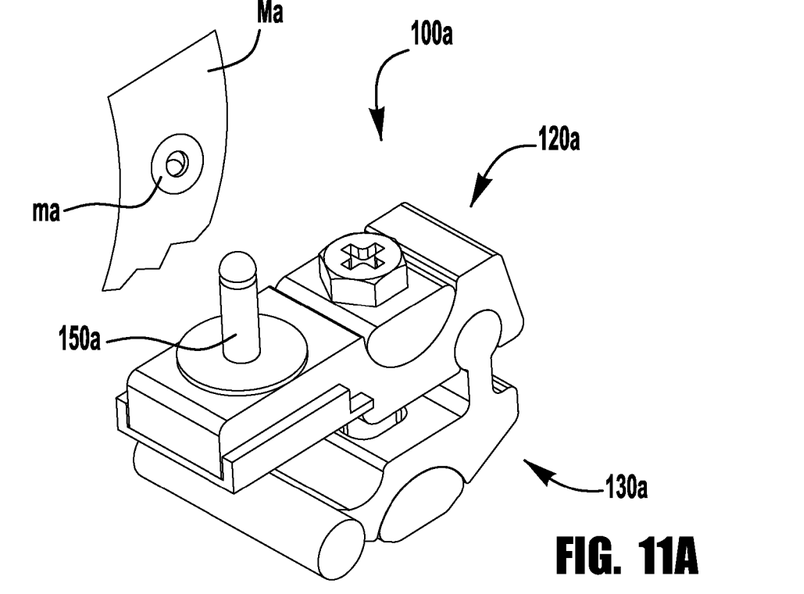
FIG. 11A is a perspective view of an exemplary clamp using a pin and socket attachment feature.
Figure 11B:
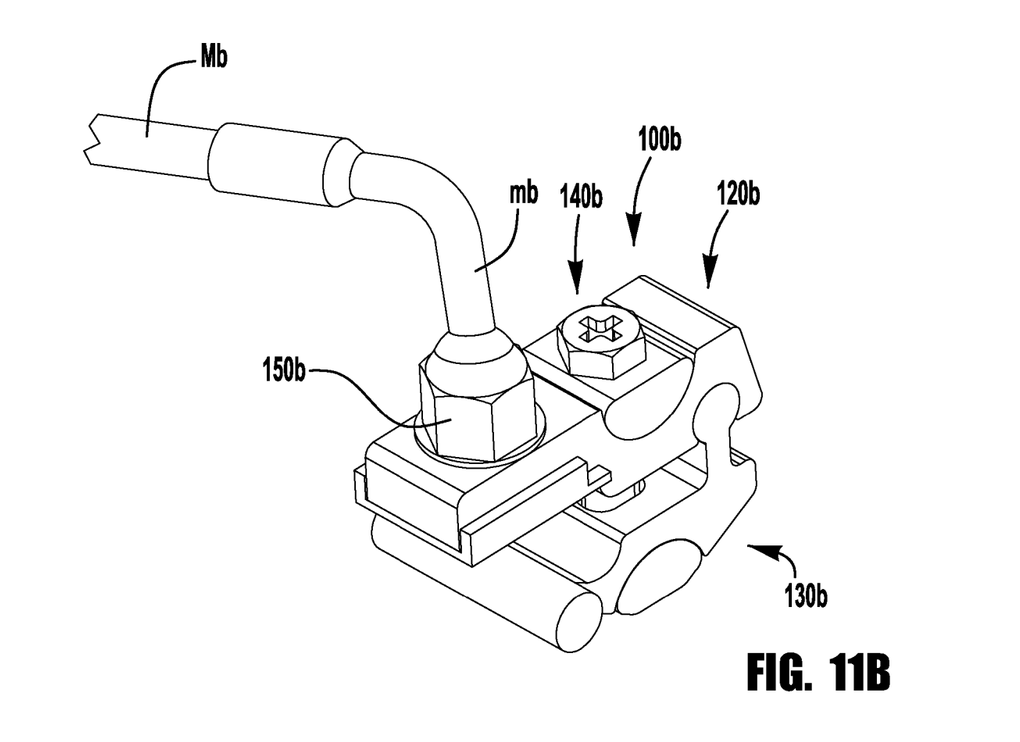
FIG. 11B is a perspective view of an exemplary clamp using a swivel joint attachment feature.
Figure 11C:
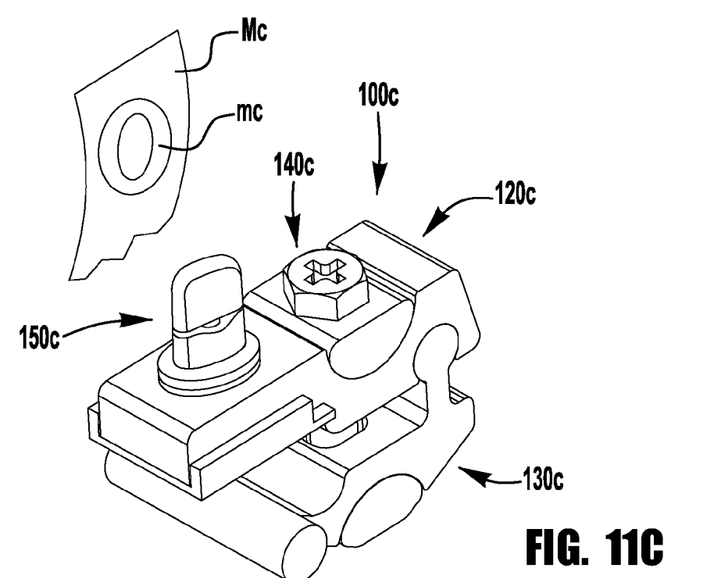
FIG. 11C is a perspective view of an exemplary clamp using a pivoting latch attachment feature.
Figure 11D:
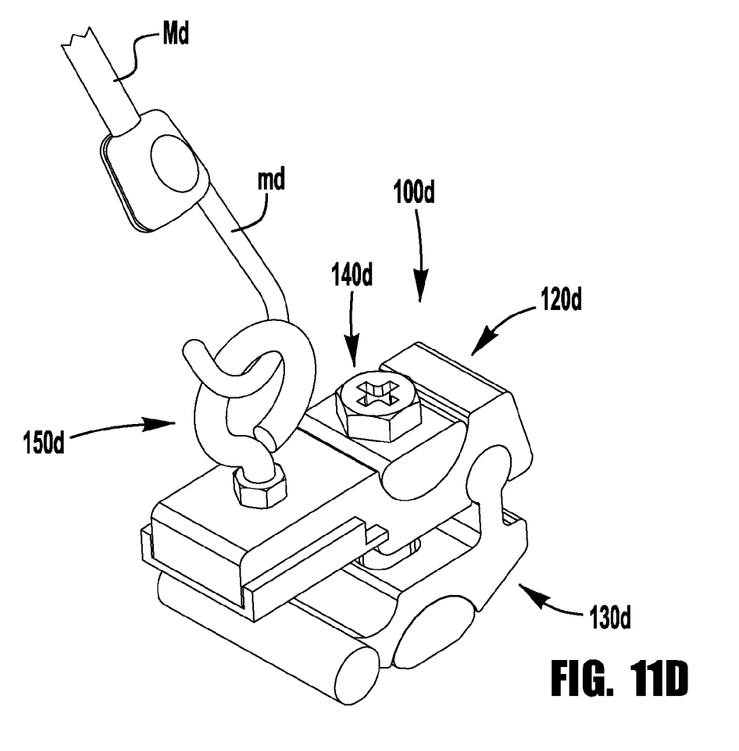
FIG. 11D is a perspective view of an exemplary clamp using an eye bolt attachment feature.

Other clamp features and configurations may additionally or alternatively be employed. For example, other attachment features may be utilized, including hooks, threaded holes for the attachment of bolts or other fasteners, clips, carabiners, and other such fasteners and connectors. FIGS. 11A, 11B, 11C, and 11D illustrate additional exemplary embodiments of clamps for securing an item or material to a structure to be clamped. FIG. 11A illustrates a clamp 100a having a pin 150a secured to an outer surface of a first clamp member 120a, with the pin 150a configured to be secured to a corresponding socket $m_a$ disposed on an item $M_a$ (e.g., a liner). One example of a pin and socket fastening arrangement is the Lift-the-DOT® fastener manufactured by Scovill Fasteners, Inc. FIG. 11B illustrates a clamp 100b having a swivel socket 150b secured to an outer surface of the first clamp member 120b, the swivel socket 150b being configured to be secured to a corresponding ball joint $m_b$ attached to an item $M_b$ (e.g., a support rod). FIG. 11C illustrates a clamp 100c having a pivotable latch 150c secured to an outer surface of the first clamp member 120c, with the pivotable latch 150c being configured to be secured to a corresponding slot $m_c$ disposed on an item $M_c$ (e.g., a liner). One example of a pivotable latching arrangement is the Common Sense latch manufactured by Scovill Fasteners, Inc. FIG. 11D illustrates a clamp 100d having an eyebolt 150d secured to an outer surface of the first clamp member 120d, with the eye bolt 120d being configured to be secured to a corresponding hook $m_d$ attached to an item $M_d$ (e.g., a cable or bungee cord). In still other embodiments, the item or material to be attached may be integral with the clamp, such that an attachment feature is not necessary.

Figure 12:
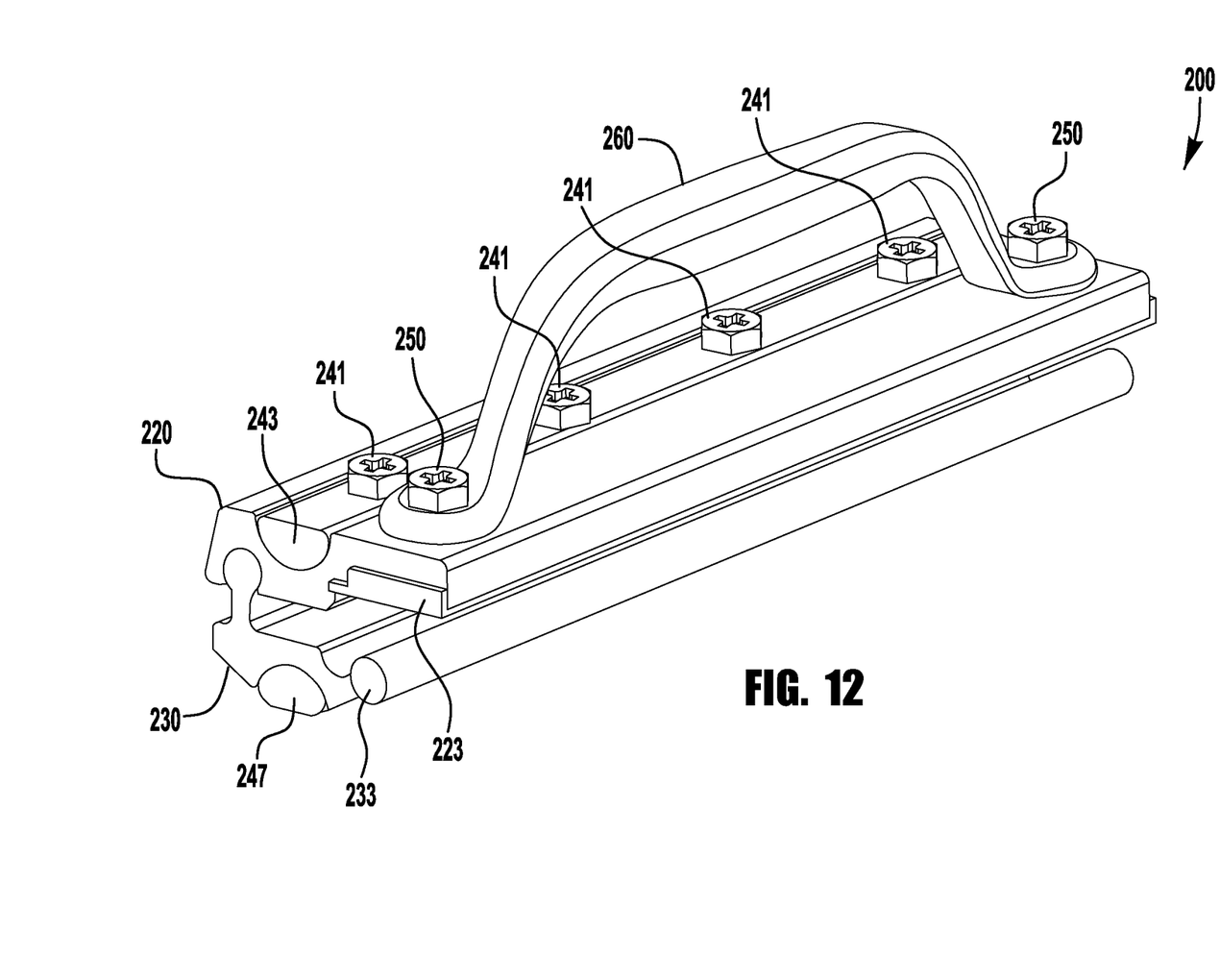
FIG. 12 is a perspective view of an exemplary clamp using multiple attachment features and multiple clamping bolts.

In another exemplary embodiment, as illustrated in FIG. 12, a clamp 200 includes clamp members 220, 230 provided in a width sufficient to accommodate multiple attachment features 250 (for example, for secure attachment of a handle 260, as shown). In the illustrated example, multiple bolts 241 (e.g., consistent with the fastening mechanism 140 of FIGS. 2-10) may be assembled with an elongated multi-apertured washer 243 and an elongated multi-bored nut 247 to provide substantially uniform clamping along the entire width of the clamp 200.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

What is claimed is:

1. A clamp comprising:
   a first clamp member including a first inner surface having a substantially planar first clamping surface and a first hinge portion, and a first access bore extending from the first inner surface to a first outer surface opposite the first inner surface;
   a second clamp member including a second inner surface having a cylindrical second clamping surface facing the first clamping surface and a second hinge portion, joined with the first hinge portion for pivoting movement of the second clamp member with respect to the first clamp member about a first axis across a range of clamping positions, and a second access bore extending from the second inner surface to a second outer surface opposite the second inner surface;
   a nut adjacent to the second outer surface and including a threaded bore aligned with the second access bore; and
   a fastener including a head portion adjacent to the first outer surface and a threaded shaft portion extending through the first and second access bores for threaded engagement with the threaded bore of the nut;
   wherein the first and second access bores are elongated to permit pivoting movement of the shaft portion with respect to each of the first and second clamp members; and
   wherein the cylindrical second clamping surface has a central axis that is parallel to the first axis and distal to the first clamping surface, to provide a uniform band of engagement between the second clamping surface and any one of a plurality of flat structures having a range of thicknesses corresponding to the range of clamping positions, when clamped between the first and second clamping surfaces.

2. The clamp of claim 1, wherein the head portion of the fastener includes an arcuate seating portion complementary to and received within an arcuate recessed seat disposed in the first outer surface of the first clamp member, wherein the arcuate seating portion and the arcuate recessed seat are contoured to permit sliding rotation of the head portion about a second axis parallel to the first axis and to provide uniform seating engagement across the range of clamping positions.

3. The clamp of claim 2, wherein the arcuate seating portion is semi-cylindrical.

4. The clamp of claim 2, wherein the fastener includes a bolt and a washer, with the arcuate seating portion being disposed on the washer.

5. The clamp of claim 4, wherein each of the arcuate seating portion and the arcuate recessed seat are semi-cylindrical, thereby preventing rotation of the washer about a rotational axis of the bolt.

6. The clamp of claim 1, wherein the nut includes an arcuate seating portion complementary to and received within an arcuate recessed seat disposed in the second outer surface of the second clamp member, wherein the arcuate seating portion and the arcuate recessed seat are contoured to permit sliding rotation of the nut about a second axis parallel to the first axis and to provide uniform seating engagement across the range of clamping positions.

7. The clamp of claim 6, wherein the arcuate seating portion is semi-cylindrical.

8. The clamp of claim 6, wherein the arcuate seating portion and the arcuate recessed seat are both semi-cylindrical, thereby preventing rotation of the nut about a rotational axis of the bolt.

9. The clamp of claim 1, wherein the first hinge portion comprises a socket and the second hinge portion comprises a stem and a bead extending from the stem and retained within the socket.

10. The clamp of claim 9, wherein the range of clamping positions is limited by engagement of the stem with an edge portion of the socket.

11. The clamp of claim 1, wherein the range of clamping positions is limited by engagement of the fastener with one of the first and second access bores.

12. A method of attaching a material to a frame member having first and second opposed flat parallel sides extending to an edge, the method comprising:
providing a clamp comprising first and second clamp members pivotally joined at a first end, the first and second clamp members including opposed first and second clamping surfaces at a second end opposite the first end, the first clamping surface being substantially planar and the second clamping surface being arcuate with a radius of curvature about a second axis parallel to the first axis and distal to the first clamping surface;
engaging the first flat side of the frame member with the first clamping surface, such that the edge of the frame member abuts a projection disposed on an inner surface of the first clamp member;
pivoting the second clamp member about a first axis parallel to the edge of the frame member to a clamping position to engage the second clamping surface with the second flat side of the frame member;
tightening a clamping fastener installed through aligned first and second access bores in the first and second clamp members
to secure the second clamp member in the clamping position; and
securing the material to an attachment feature disposed on an outer surface of the first clamp member;
wherein pivoting the second clamp member about the first axis to the clamping position provides a uniform band of engagement between the second clamping surface and the second side of the frame member when the second clamp member is pivoted to the clamping position.

13. The method of claim 12, wherein installing the clamping fastener through the aligned access bores in the first and second clamp members comprises inserting a threaded bolt through a washer in seating engagement with the outer surface of the first clamp member and through the first and second access bores, and threadingly engaging a nut in seating engagement with an outer surface of the second clamp member.

14. The method of claim 13, wherein the washer includes an arcuate seating portion complementary to and received within an arcuate recessed seat disposed in the outer surface of the first clamp member, wherein the arcuate seating portion and the arcuate recessed seat are contoured to permit sliding rotation of the washer about a second axis parallel to the first axis and to provide uniform seating engagement across a range of clamping positions.

15. The method of claim 13, wherein the nut includes an arcuate seating portion complementary to and received within an arcuate recessed seat disposed in the outer surface of the second clamp member, wherein the arcuate seating portion and the arcuate recessed seat are contoured to permit sliding rotation of the nut about a second axis parallel to the first axis and to provide uniform seating engagement across a range of clamping positions.

16. The method of claim 12, wherein the attachment feature comprises a snap member.

17. The method of claim 12, wherein the projection comprises a shoulder extending across a width of the first clamp member.

18. In combination, a clamp secured to a frame member having first and second opposed flat parallel sides extending to an edge, the clamp comprising:
a first clamp member including a first inner surface having a first hinge portion and a substantially planar first clamping surface engaging the first flat side of the frame member, the first clamping surface extending to a projection disposed on the first inner surface, the projection abutting the edge of the frame member;
a second clamp member including a second inner surface having an arcuate second clamping surface engaging the second flat side of the frame member, and a second hinge portion pivotally joined with the first hinge portion for pivoting movement of the second clamp member with respect to the first clamp member about a first axis across a range of clamping positions, the arcuate second clamping surface having a radius of curvature about a second axis parallel to the first axis and distal to the first clamping surface, to provide a uniform band of engagement between the second clamping surface and the second side of the frame member;
a clamp fastening mechanism installed through aligned access bores in the first and second clamp members to secure the first and second clamp members in clamping engagement with the frame member; and
an attachment feature disposed on an outer surface of the first clamp member for securing a material to the frame member.

19. The combination of claim 18, wherein the attachment feature comprises a snap member riveted to the first clamp member.

20. The combination of claim 18, wherein the projection comprises a shoulder extending across a width of the first clamp member.

21. The combination of claim 18, wherein the arcuate second clamping surface includes a cylindrical surface.

* * * * *